United States Patent [19]
Bakker et al.

[11] Patent Number: 5,834,694
[45] Date of Patent: Nov. 10, 1998

[54] CAPILLARY ACTION PREVENTOR

[75] Inventors: John Henry Bakker, Cortland; John George Kountz, Poland, both of Ohio; Vickey Elisa Reed, Beaver Falls, Pa.

[73] Assignee: General Motors Corporation, Detroit, Mich.

[21] Appl. No.: 862,494

[22] Filed: May 23, 1997

[51] Int. Cl.⁶ .................................................. H02G 3/18
[52] U.S. Cl. ..................... 174/65 G; 174/92; 174/152 G; 174/135
[58] Field of Search ........................... 174/92, 91, 138 F, 174/65 G, 65 R, 151, 152 G, 153 G, 135; 248/56; 16/2.1, 2.2

[56] References Cited

U.S. PATENT DOCUMENTS

| | | | |
|---|---|---|---|
| 3,089,210 | 5/1963 | Ritter | 174/135 X |
| 3,183,302 | 5/1965 | Wochner et al. | 174/138 F |
| 4,029,896 | 6/1977 | Skinner | 174/138 F |
| 4,289,924 | 9/1981 | Pearce, Jr. et al. | 174/152 G |
| 4,692,564 | 9/1987 | Campbell et al. | 174/92 |
| 4,797,513 | 1/1989 | Ono et al. | 174/153 G |
| 5,270,487 | 12/1993 | Sawamura | 174/65 G X |
| 5,397,859 | 3/1995 | Robertson et al. | 174/92 |
| 5,453,579 | 9/1995 | Cohea | 174/65 G X |
| 5,569,882 | 10/1996 | Yokoyama et al. | 174/92 X |
| 5,594,210 | 1/1997 | Yabe | 174/92 X |
| 5,606,150 | 2/1997 | Radliff et al. | 174/92 |

FOREIGN PATENT DOCUMENTS 2645683   10/1990   France ................................ 174/92 X

*Primary Examiner*—Dean A. Reichard
*Attorney, Agent, or Firm*—Cary W. Brooks

[57] ABSTRACT

A capillary action preventor (CAP) for separating water and other liquids from a bundle of wires has a body and a cover of plastic construction that are attached to each other by a flexible plastic hinge. The body is generally bulb shaped and has an open channel at each longitudinal end that is reduced in height and width in comparison to a midsection of the body. Each channel has a pair of flexible cantilevered fingers at the top for holding a portion of a bundle of electrical wires that passes through the CAP. The body includes a comb-like structure comprising a plurality of laterally spaced, relatively stiff, vertical fingers at its midsection for separating the electrical wires. The electrical wires are supported on a plurality of narrow transverse baffles that define a sump area between the channels for the collection of water and other liquids dripping from the electrical wires. The sump area includes a drain tube. The cover is generally dome shaped and has an open arch at each longitudinal end that is reduced in height and width in comparison to a midsection of the cover. The arches mate with the channels when the cover is closed and the cover includes a plurality of transverse ribs that keep the electrical wires in the spaces between the vertical fingers of the body when the cover is closed. The CAP includes a latch to keep the cover in a closed position and external ribs for use in taping the CAP shut.

11 Claims, 2 Drawing Sheets

CAPILLARY ACTION PREVENTOR

TECHNICAL FIELD

This invention relates generally to electrical wiring harnesses and more particularly to electrical wiring harnesses for automobiles and the like that pass through a panel hole from a harsh environment to a protected environment.

BACKGROUND OF THE INVENTION

Passenger cars and trucks have several wiring harnesses that have a portion exposed to weather and road conditions and then pass through a panel hole into a protected environment such as a passenger compartment or trunk. For instance, passenger cars and trucks commonly have several electrical wiring harnesses in the engine compartment that pass through a hole in the bulkhead wall that separates the engine compartment from the passenger compartment. A rubber or elastomeric grommet seal is typically provided to seal the passage hole.

Electrical wiring harnesses typically comprise a bundle of electrical wires that are held in close proximity to each other by tape or conduit. Consequently, an electrical wiring harness that is exposed to a great deal of water, for instance when an automobile is driven in a rain storm, tends to collect water and move the water along the bundle of wires by a capillary or wicking like action into the passenger compartment. Water leakage into the passenger compartment even during a severe rain storm results in a high level of customer dissatisfaction.

One way to avoid the possibility of water leakage into the passenger compartment and assure customer satisfaction is disclosed in U.S. Pat. No. 4,289,924 granted to Warren Pearce, Jr. et al. Sep. 15, 1981, for an injectable grommet assembly. This device for passing a bundle of insulated electrical wires through a bulkhead comprises a pair of hard plastic shells that form an annular seal chamber that surrounds the bundle of wires. A comb-like wire clip in the annular seal chamber spreads the bundle of wires apart and a sealant is injected into the chamber to fill the spaces around and between the electric wires. The assembly is then attached to the face of the bulkhead over the passage hole.

This injectable grommet assembly provides a satisfactory solution to any potential water leakage problem. However, the grommet assembly is expensive to manufacture and difficult to assemble to the wiring harness.

Another way to avoid the water leakage problem is the "drip loop". The drip loop is formed in the wiring harness itself by bending a length of the bundle of wires into a vertical U-shaped configuration with the bottom portion of the U-shaped configuration at the low point. Any confinement of the bundle of wires in the bottom portion, such as tape or conduit is removed and the bundle of wires in the bottom portion is spread apart so that the individual wires are spaced apart from each other. Any water or other liquid travelling along the wiring harness drops off the spaced wires at the bottom of the drip loop.

The drip loop also provides a satisfactory solution to any potential water leakage problem. However, the drip loop requires an extra length of wiring harness which tends to be expensive. Moreover, the drip loop requires considerable space to execute the drip loop that is not always available in a crowded environment such as an engine compartment of an automobile.

SUMMARY OF THE INVENTION

The object of this invention is to provide a device for preventing water leakage induced by a capillary or wick-like action that is compact and inexpensive.

Another object of this invention is to provide such a device (which we refer to as a capillary action preventor or CAP) that is attached to a wiring harness easily.

The capillary action preventor or CAP of our invention has one or more of the following features:

a body and cover of plastic material that are molded as one piece and attached to each other by a flexible hinge or strap for manufacturing economy and ease of assembly to the wiring harness;

a comb-like structure comprising a plurality of laterally spaced, relatively stiff, vertical fingers that separate a bundle of wires to break any capillary or wick-like action;

notches at all four corners of each vertical finger to enhance liquid removal;

a sump area that is isolated from the bundle of wires passing through the device;

baffles in the sump area that control liquid flow to a drain tube and support the bundle of wires passing through the device;

flexible fingers for retaining the body on the bundle of wires during the assembly process;

internal ribs for retaining the separated bundle of wires in the comb-like structure when the cover is closed;

a latch to retain the cover in the closed position; and external ribs to facilitate taping the cover shut.

Further objects, features and advantages of the present invention will be apparent from the following description taken in conjunction with the accompanying drawings.

DESCRIPTION OF THE PREFERRED EMBODIMENT

Figure 1:
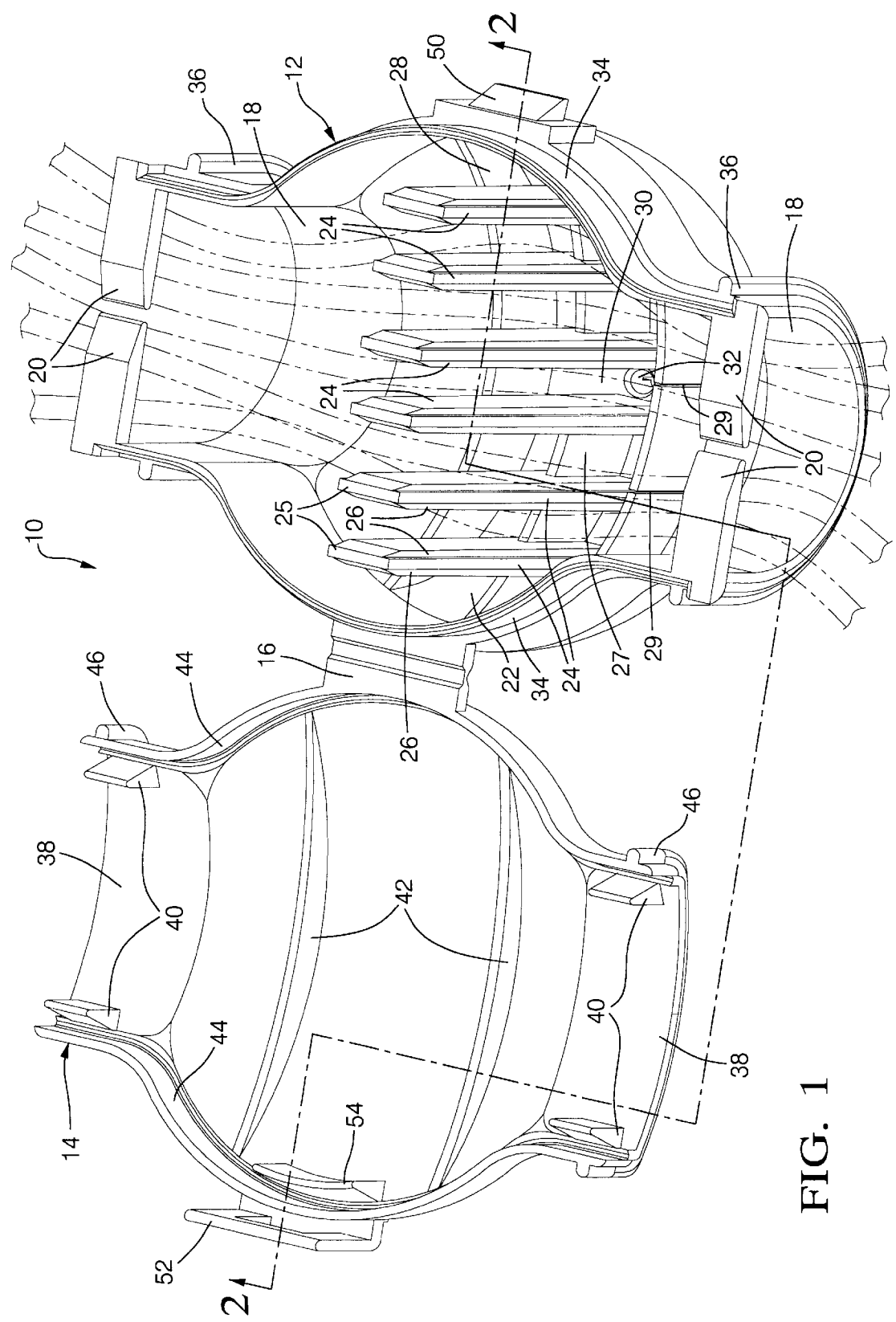
FIG. 1 is a perspective view of a capillary action preventor in accordance with the invention.

Referring now to the drawings, the capillary action preventor 10 (hereafter CAP) comprises a body 12 and a cover 14 that are preferably of molded plastic construction and molded as one piece with the body 12 and the cover 14 attached to each other by a flexible strap or hinge 16.

Body 12 is generally bulb shaped with a hemispherical bottom and symmetrical about an imaginary vertical center plane that bisects body 12 at its widest point. Body 12 has an open channel 18 at each longitudinal end that is reduced in height and width in comparison to the midsection of body 12. Each channel 18 has a pair of flexible cantilevered fingers 20 at the top that extend beyond the end of the channel in the longitudinal direction. The two channels 18 receive spaced portions of a bundle of electrical wires (shown in phantom) that pass through CAP 10. The bundle of electrical wires are part of a typical electrical wiring harness (not shown). The CAP is attached to the wiring harness by pushing the bundle of electrical wires down into the channels 18 past the respective pairs of flexible cantilevered fingers 20 which then serve to hold the bundle of electrical wires in the channels 18 until the cover 14 is closed.

Figure 2:
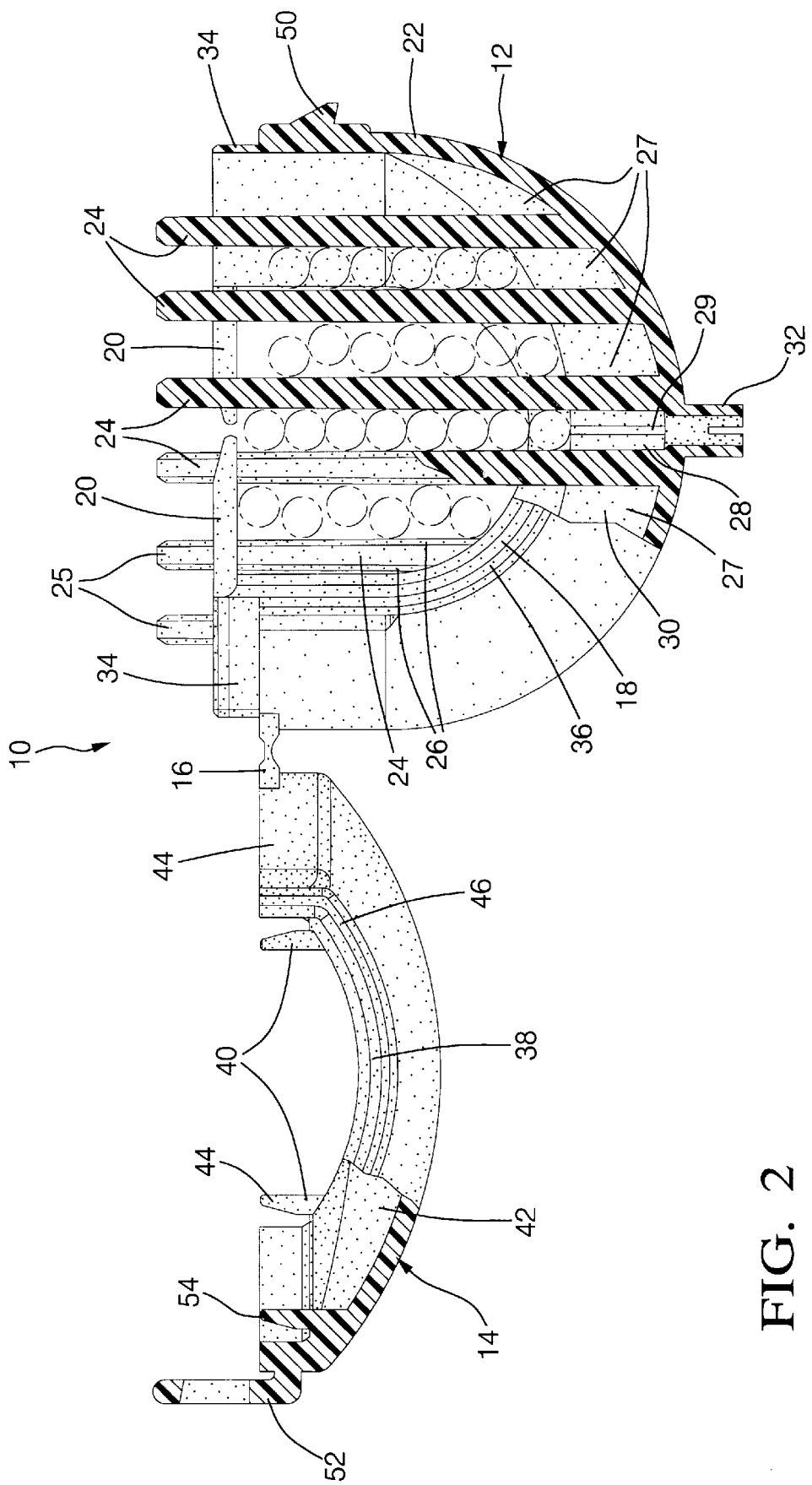
FIG. 2 is a partially sectioned end view of the capillary action preventor shown in FIG. 1.

Body 12 bulges out between channels 18 reaching its greatest depth and width at the midsection 22 that includes the imaginary vertical center plane. Midsection 22 includes a comb-like structure comprising a plurality of laterally spaced, relatively stiff, vertical fingers 24 that extend up into and preferably through the interior of body 12 from the bottom wall of body 12 to tips 25 that protrude above body 12 as best shown in FIG. 2. Fingers 24 have a rectangular cross section with notches 26 at all four corners as best shown in FIG. 1. Midsection 22 further includes a narrow transverse baffle 27 that extends up into the interior of body 12 from the bottom wall and that intersects the bottom portions of fingers 24. Baffle 27 has a wide central gap that leaves empty space between the middle two fingers 24. Baffle 27 has a low vertical height and is crescent shaped so that baffle 27 merges into the side wall of body 12 and is always spaced outwardly of the channels 18 as best shown in FIG. 2.

Body 12 includes two more narrow transverse baffles 28 that are midway between baffle 27 and the respective channels 18. Baffles 28 also have low vertical heights and are also crescent shaped and merge into the side wall of body 12 and are spaced outward of channels 18. Baffles 28 are spaced from fingers 24 and each baffle 28 has three laterally spaced vertical slots 29 that extend from the top of the baffle to the bottom wall of body 12.

Baffles 27 and 28 support the electrical wires above the bottom wall of the body 12 between the channels 18 so that the body 12 has a sump area below the electrical wires for the collection of water and other liquids that may be borne by the electrical wires. The sump area which is indicated generally at 30 includes an integral drain tube 32. Drain tube 32 is preferably located at the center of the bottom wall of body 12 in the empty space between the middle two fingers 24 of the comb like structure in midsection 22. Baffles 27 and 28 control the flow of liquids to the hole of drain tube 32 in addition to supporting the electrical wires.

The top of the body 12 has a sealing lip 34 on each side that extends to the end of each channel 18 and each channel 18 also has an exterior U-shaped rib 36 at the end remote from midsection 22.

Cover 14 is generally dome shaped and is also symmetrical about the imaginary vertical center plane that bisects the cover 14 at its widest point. Cover 14 has an open arch 38 at each end that is reduced in height and width in comparison to the midsection of cover 14. Each arch 38 has a pair of vertical fingers 40 that engage the inside surface of the seal lip 34 inwardly of the flexible fingers 20 in the channels 18 of the body 12 when cover 14 is closed. This enhances mating of the open arches 38 with the open channels 18.

Cover 14 bulges out between the arches 38 reaching its greatest depth and width at the midsection that includes the imaginary vertical center plane. The inside surface of the midsection is preferably smooth to provide maximum space for the tips 25 of the laterally spaced vertical fingers 24 of the body 12 when the cover 14 is closed. However, the cover 14 does include two transverse ribs 42 that are aligned with the transverse baffles 28 of body 12 that are midway between baffle 27 and the respective channels 18. Ribs 42 have a low vertical height and are crescent shaped so that the transverse ribs 42 merge into the side wall of cover 14 and are always spaced outwardly of the arches 38 as best shown in FIG. 2.

The transverse ribs 42 space the electrical wires away from the inside top surface of cover 14 and keep the separated electrical wires in the spaces between the vertical fingers 24. To this end the transverse ribs 42 preferably extend below the tips 25 of fingers 24 when cover 14 is closed.

The bottom of cover 14 has a sealing lip 44 on each side that extends to the end of each arch 38. Sealing lip 44 overlaps sealing lip 34 of body 12 on the outside to provide a sealed interface when cover 14 is closed. Each arch 38 also has an exterior U-shaped rib 46 at the end remote from the midsection.

CAP 10 has a latch to keep the cover 14 in the closed position. The latch comprises an exterior latch nib 50 on the side of body 12 opposite the flexible hinge 16 and a cooperating exterior latch arm 52 on the side of cover 14 that snaps over latch nib 50 when cover 14 is closed. Cover 14 also has an interior finger 54 on the opposite side of sealing lip 44 from latch arm 52. Finger 54 engages inside surface of seal lip 34 to enhance mating of the midsections of the body 12 and the cover 14 when the cover is closed. Finger 54 also enhances the sealing effectiveness of sealing lips 34 and 44.

CAP 10 may be attached to an electrical wiring harness anywhere along a bundle of wires forming part of the wiring harness in the following manner. With CAP 10 in the open position, as shown in FIGS. 1 and 2, the bundle of electrical wires is pushed down into the channels 18 of body 12 past flexible fingers 20 so that the bundle of wires is held in channels 18 by the flexible fingers 20. The portion of the wire bundle between channels 18 is then spread apart and individual electrical wires of the bundle are separated and pushed into various ones of the several spaces between the vertical fingers 24 in the midsection 22 of body 12. Cover 14 is then closed 10 over the bundle of electrical wires and latched shut by latch arm 52 snapping over nib 50. Cover 14 may also be taped shut by wrapping tape around the exterior of the two end channels 18 and the two mating arches 38. The tape is wrapped between the exterior ribs 36 and 46 over the bulging portions of body 12 and cover 14.

In any event, the closed cover 14 when held shut keeps the individual wires of the wire bundle distributed in the spaces between the vertical fingers 24 so that any water or other liquid that is brought into the CAP 10 along the bundle of wires drops off the electrical wires into the sump 30. The water and other liquids are collected in sump 30 and dumped through the hole of drain tube 32. The separation of the electrical wires by the fingers 24 promotes separation of the water and other liquids from the electrical wires and the liquid separation is enhanced by notches 26 at the four corners of the fingers 24. Baffles 27 and 28 keep the electrical wires elevated above the water and other liquids that may have collected in the sump 30 and also control the flow of water and other liquids in sump 30 to the hole of drain tube 32.

While CAP 10 is illustrated as having a lock nib 50 on body 12 and a lock arm on cover 14, other latching arrangements are possible. In other words, we wish it to be understood that we do not desire to be limited to the exact details of construction shown and described for obvious modifications will occur to a person skilled in the art without departing from the spirit and scope of our invention.

Obviously, many modifications and variations of the present invention in light of the above teachings may be made. It is, therefore, to be understood that, within the scope of the appended claims, the invention may be practiced otherwise than as specifically described.

We claim:

1. A capillary action preventor for separating water and other liquids from a bundle of wires comprising:

a body and a cover of plastic construction that are attached to each other by a flexible hinge, the body being generally bulb shaped and having opposite longitudinal ends that are reduced in height and width in comparison to a midsection of body, the longitudinal ends of the body having channels that have flexible cantilevered fingers adjacent tops of the channels for holding portions of a bundle of electrical wires that passes through the capillary action preventor, the body bulging out between the channels and reaching its greatest depth and width at the midsection of the body that includes a comb-like structure comprising a plurality of laterally spaced, relatively stiff, vertical fingers that extend into the interior of body from a bottom wall of the body, the body further including a sump area between and below the channels for the collection of water and other liquids, the sump area including a drain hole, the cover being generally dome shaped and having opposite longitudinal ends that are reduced in height and width in comparison to a midsection of the cover, the longitudinal ends of the cover having arches that mate with the channels when the cover is closed, the cover further including a portion that keeps the electrical wires in spaces between the vertical fingers of the body when the cover is closed, and a latch to keep the cover in a closed position.

2. The capillary action presenter as defined in claim 1 wherein the body includes at least one transverse baffle in the sump area to support electrical wires above the sump area.

3. The capillary action preventor as defined in claim 2 wherein the cover has at least one transverse rib that keeps the electrical wires in the spaces between the vertical fingers.

4. A capillary action preventor for separating water and other liquids from a bundle of wires comprising:

a body and a cover of plastic construction that are attached to each other by a flexible hinge, the body being generally bulb shaped and having opposite longitudinal ends that are reduced in height and width in comparison to a midsection of body, the longitudinal ends of the body each having a channel that has a pair of flexible cantilevered fingers for holding portions of a bundle of electrical wires that passes through the capillary action preventor in the channels, the body bulging out between the channels and reaching its greatest depth and width at the midsection of the body that includes a comb-like structure comprising a plurality of laterally spaced, relatively stiff, vertical fingers that extend through the interior of the body from a bottom wall of the body to tips that protrude above the body, the body further including a plurality of narrow transverse baffles that extend up into the interior of the body from the bottom wall to define a sump area between the channels for the collection of water and other liquids and to support electrical wires above the sump area, the sump area including a drain tube, the cover being generally dome shaped and having opposite longitudinal ends that are reduced in height and width in comparison to a midsection of the cover, the longitudinal ends of the cover having arches that mate with the channels when the cover is closed, the cover further including a plurality of transverse ribs that keep the electrical wires in spaces between the vertical fingers of the body when the cover is closed, and a latch to keep the cover in a closed position.

5. The capillary action preventor as defined in claim 4 wherein the body and the cover have overlapping seal lips.

6. The capillary action preventor as defined in claim 4 wherein the body has a seal lip, the cover has a seal lip that overlaps an outside surface of the seal lip of the body, and the cover has a plurality of fingers that engage an inside surface of the seal lip of the body to enhance mating of the body and the cover when the cover is closed.

7. The capillary action preventor as defined in claim 4 wherein the channels and the arches have exterior ribs for use in taping the cover shut.

8. A capillary action preventor for separating water and other liquids from a bundle of wires comprising:

a body and a cover of plastic construction that are attached to each other by a flexible hinge, the body being generally bulb shaped and having opposite longitudinal ends that are reduced in height and width in comparison to a midsection of body, the longitudinal ends of the body each having a channel that has a pair of flexible cantilevered fingers for holding portions of a bundle of electrical wires that passes through the capillary action preventor in the channels, the body bulging out between the channels and reaching its greatest depth and width at the midsection of the body that includes a comb-like structure comprising a plurality of laterally spaced, relatively stiff, vertical fingers that extend through the interior of the body from a bottom wall of the body to tips that protrude above the body, the body further including a plurality of narrow transverse baffles that extend up into the interior of the body from the bottom wall to define a sump area between the channels for the collection of water and other liquids and to support electrical wires above the sump area, the sump area including a drain tube, the cover being generally dome shaped and having opposite longitudinal ends that are reduced in height and width in comparison to a midsection of the cover, the longitudinal ends of the cover having arches that mate with the channels when the cover is closed, the cover further including a plurality of transverse ribs that keep the electrical wires in spaces between the vertical fingers of the body when the cover is closed, a latch to keep the cover in a closed position, and the plurality of narrow transverse baffles including a first baffle located between the comb-like structure and each channel, said first baffle, including at least one of slot for controlling flow to the drain tube.

9. The capillary action preventor as defined in claim 8 wherein each first baffle includes a plurality of slots for controlling flow to the drain tube.

10. A capillary action preventor for separating water and other liquids from a bundle of wires comprising:

a body and a cover of plastic construction that are attached to each other by a flexible hinge, the body being generally bulb shaped and having opposite longitudinal ends that are reduced in height and width in comparison to a midsection of body.

the longitudinal ends of the body each having a channel that has a pair of flexible cantilevered fingers for holding portions of a bundle of electrical wires that passes through the capillary action preventor in the channels, the body bulging out between the channels and reaching its greatest depth and width at the midsection of the body that includes a comb-like structure comprising a plurality of laterally spaced, relatively stiff, vertical fingers that extend through the interior of the body from a bottom wall of the body to tips that protrude above the body, the body further including a plurality of narrow transverse baffles that extend up into the interior of the body from the bottom wall to define a sump area between the channels for the collection of water and other liquids and to support electrical wires above the sump area, the sump area including a drain tube, the cover being generally dome shaped and having opposite longitudinal ends that are reduced in height and width in comparison to a midsection of the cover, the longitudinal ends of the cover having arches that mate with the channels when the cover is closed, the cover further including a plurality of transverse ribs that keep the electrical wires in the spaces between the vertical fingers of the body when the cover is closed, a latch to keep the cover in a closed position, and the vertical fingers each having a rectangular cross section with notches at each corner to enhance fluid separation.

11. A capillary action preventor for separating water and other liquids from a bundle of wires comprising:

a body and a cover of plastic construction that are molded as one piece with the body and the cover attached to each other by a flexible strap or hinge, the body being generally bulb shaped and having opposite longitudinal ends that are reduced in height and width in comparison to a midsection of the body, the longitudinal ends of the body each having a channel that has a pair of flexible cantilevered fingers for holding a portion of a bundle of electrical wires that pass through the capillary action preventor in the channel, the body bulging out between the channels and reaching its greatest depth and width at the midsection of the body that includes a comb-like structure comprising as plurality of laterally spaced, relatively stiff, vertical fingers that extend through the interior of body from a bottom wall of the body to tips that protrude above the body, the midsection of the body further including a first narrow transverse baffle that extends up into the interior of the body from a bottom wall and that intersects bottom portions of the fingers, the first baffle having a wide central gap that leaves an empty space between two fingers at a middle of the midsection of the body, the first baffle having a low vertical height and a crescent shape so that the first baffle merges into a side wall of the body and is spaced outwardly of the channels, the body including second and third narrow transverse baffles that are midway between the first baffle and the respective channels, the second and third baffles having low vertical heights and crescent shapes for merging into the side wall of the body and spacing outward of the channels, the second and third baffles being spaced from the vertical fingers and each having a plurality of laterally spaced vertical slots that extend from the top of the baffle toward the bottom wall of the body, the first, second and third baffles being adapted to support electrical wires above the bottom wall of the body between the channels so that the body has a sump area below the electrical wires for the collection of water and other liquids that may be borne by the electrical wires, the sump area including an integral drain tube that is located at a middle of the bottom wall of the body in the empty space between the two fingers, the body having a top provided with a sealing lip that extends between the opposite longitudinal ends of the body, each channel having an exterior rib at an end remote from the midsection of the body, the cover being generally dome shaped and having opposite longitudinal ends that are reduced in height and width in comparison to a midsection of the cover, the longitudinal ends of the cover each having an arch that has a pair of vertical fingers that engage an inner surface of the sealing lip of the body when the cover is closed, the cover bulging out between the arches and reaching its greatest depth and width at the midsection of the cover that has a smooth inside surface to provide maximum space for the tips of the laterally spaced vertical fingers of the body when the cover is closed, the cover further including two transverse ribs that are aligned with the second and third baffles of the body, the ribs having a low vertical height and a crescent shape so that the ribs merge into a side wall of the cover and are spaced outwardly of the arches, the ribs being adapted to space the electrical wires away from an inside top surface of the cover and extending below the tips of the fingers of the body to keep the electrical wires in spaces between the vertical fingers when the cover is closed, the cover having a sealing lip that extends between the opposite longitudinal ends of the cover and engages an outer surface of the sealing lip of the body to provide a sealed interface when the cover is closed, and each arch having an exterior rib at an end remote from the midsection of the cover, and a latch to keep the cover in a closed position.

* * * * *